United States Patent
Krauss et al.

(10) Patent No.: US 7,539,833 B2
(45) Date of Patent: May 26, 2009

(54) LOCATING WASTED MEMORY IN SOFTWARE BY IDENTIFYING UNUSED PORTIONS OF MEMORY BLOCKS ALLOCATED TO A PROGRAM

(75) Inventors: Kirk J. Krauss, Los Gatos, CA (US); Allan K. Pratt, Sunnyvale, CA (US); Jonathan M. Sanders, Los Gates, CA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 11/005,081

(22) Filed: Dec. 6, 2004

(65) Prior Publication Data

US 2006/0123216 A1 Jun. 8, 2006

(51) Int. Cl.
*G06F 12/00* (2006.01)
*G06F 13/00* (2006.01)
*G06F 13/28* (2006.01)
*G06F 9/44* (2006.01)
*G06F 9/45* (2006.01)

(52) U.S. Cl. ........................ 711/170; 717/127; 717/131; 717/132; 717/133; 717/111; 717/151; 717/154; 717/155; 717/156; 711/100

(58) Field of Classification Search ................ 717/133, 717/128; 711/171
See application file for complete search history.

(56) References Cited

U.S. PATENT DOCUMENTS

| | | | |
|---|---|---|---|
| 5,408,650 A * | 4/1995 | Arsenault ................... 717/124 |
| 5,613,063 A * | 3/1997 | Eustace et al. ................ 714/38 |
| 5,761,536 A | 6/1998 | Franaszek |
| 5,764,883 A * | 6/1998 | Satterfield et al. ............. 714/38 |
| 5,842,019 A * | 11/1998 | Kolawa et al. ............... 717/130 |
| 5,864,867 A | 1/1999 | Krusche et al. |
| 5,953,530 A | 9/1999 | Rishi et al. |
| 6,041,407 A | 3/2000 | Claar et al. |
| 6,314,529 B1 * | 11/2001 | Rana ........................... 714/29 |
| 6,351,845 B1 * | 2/2002 | Hinker et al. ................ 717/128 |
| 6,453,403 B1 | 9/2002 | Czajkowski |
| 6,453,404 B1 * | 9/2002 | Bereznyi et al. ............. 711/171 |
| 6,502,111 B1 | 12/2002 | Dussud |
| 6,550,056 B1 * | 4/2003 | Mizumoto et al. ........... 717/124 |
| 6,594,749 B1 | 7/2003 | Czajkowski |
| 6,665,865 B1 * | 12/2003 | Ruf ............................. 717/157 |
| 6,678,795 B1 * | 1/2004 | Moreno et al. .............. 711/137 |
| 6,725,454 B1 * | 4/2004 | Nagel et al. ................. 718/100 |
| 2002/0073400 A1 * | 6/2002 | Beuten et al. ............... 717/127 |
| 2003/0051197 A1 * | 3/2003 | Evans ......................... 714/718 |
| 2003/0187888 A1 | 10/2003 | Hayward |
| 2004/0111448 A1 | 6/2004 | Garthwaite |
| 2004/0216091 A1 * | 10/2004 | Groeschel .................... 717/128 |
| 2004/0221120 A1 * | 11/2004 | Abrashkevich et al. ...... 711/170 |

* cited by examiner

*Primary Examiner*—Sanjiv Shah
*Assistant Examiner*—Marwan Ayash
(74) *Attorney, Agent, or Firm*—Cuenot & Forsythe, L.L.C.

(57) ABSTRACT

A method of intra-block memory usage analysis for a program can include identifying a memory block that has been allocated to the program and determining at least one intra-memory block usage characteristic for the allocated memory block.

20 Claims, 4 Drawing Sheets

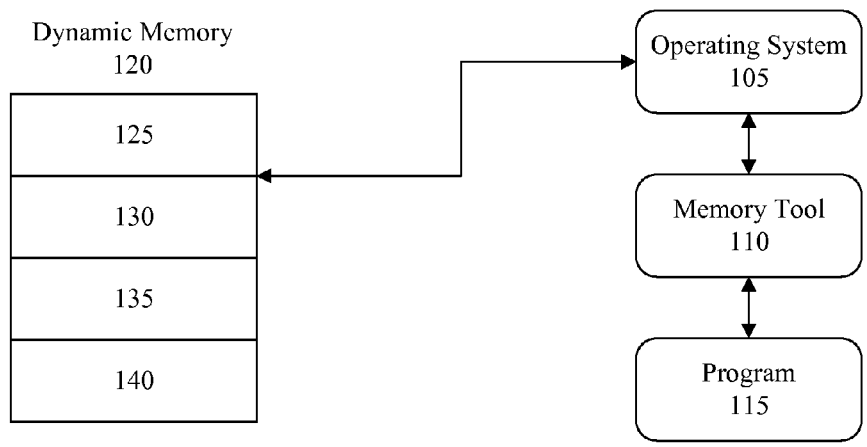
FIG. 1
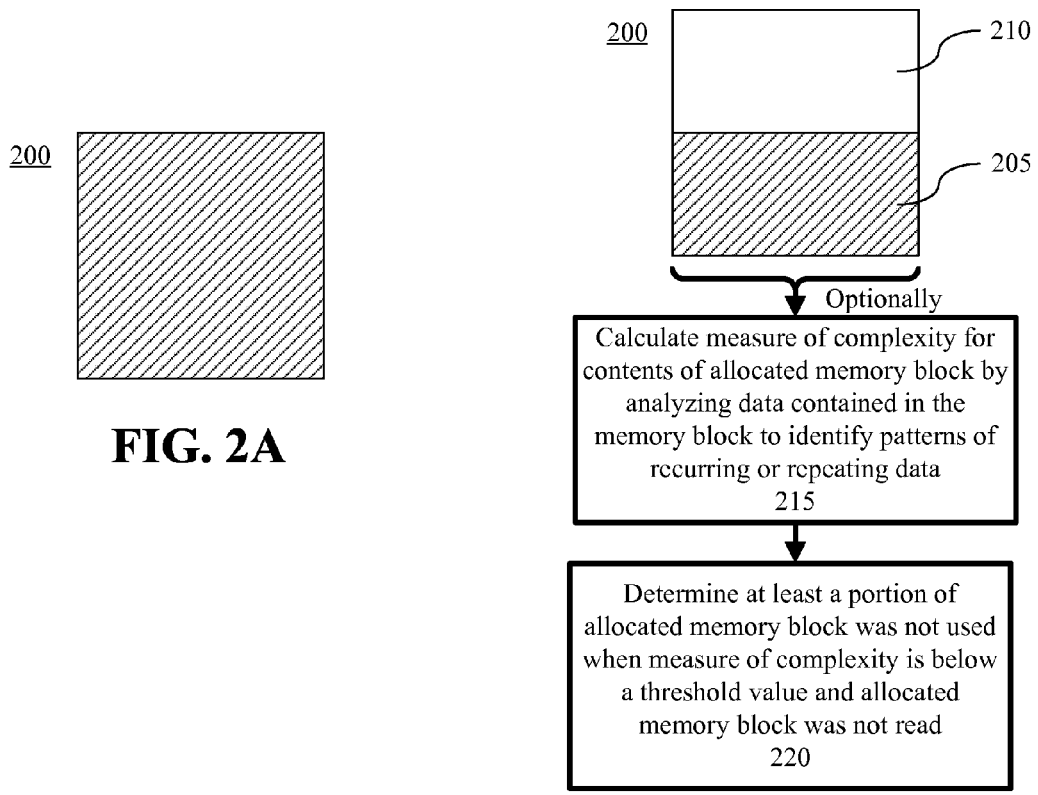
FIG. 2A
FIG. 2B

LOCATING WASTED MEMORY IN SOFTWARE BY IDENTIFYING UNUSED PORTIONS OF MEMORY BLOCKS ALLOCATED TO A PROGRAM

BACKGROUND

1. Field of the Invention

The present invention relates to software development and, more particularly, to identifying unused memory in a software application.

2. Description of the Related Art

Reducing the amount of memory needed by a software application, or computer program, during execution remains a challenge for software developers. Generally, memory is viewed as a finite resource. Memory used by one program becomes unavailable for use by others. A program that uses less memory also is more likely to fit within physical memory. This results in the ability to store more programs within the same system in physical memory. Further, when a program is stored entirely in physical memory, slower external storage mechanisms, such as swapping data between physical memory and a hard disk, need not be utilized. During development, memory conservation strategies are followed in an effort to minimize memory usage and improve software performance. The identification and elimination of wasted memory during the execution of a program remains a concern throughout the development process.

Memory typically is managed in blocks, with a memory block referring to an amount of memory that can be allocated for use by a program. Memory blocks are allocated to programs for use during execution, are tracked, and ultimately are reclaimed for future use by the same program or another program. When a memory block cannot be freed by a running program, the result is a memory leak. Usually, a memory leak occurs because the reference pointer to the memory block has been lost for one reason or another. Repeated generation of leaked memory space can cause a program to run out of memory or stop functioning altogether.

A variety of software development tools are commercially available for locating memory leaks in programs. Memory management tools, for example, can provide functions such as memory corruption detection and memory leak detection. While these functions provide useful information, to date, memory leaks have been analyzed on the memory block level. That is, conventional memory management tools determine whether an entire block of memory is being used or referenced by a given program. Intra-memory block usage by a program typically goes unnoticed. In other words, conventional memory management tools are unable to determine the amount or portion of an allocated memory block that is actually used by a program during execution.

Unused portions of allocated memory blocks are caused by a variety of different circumstances including, but not limited to, obsolete fields remaining in a data structure or using an overly general data structure for a task. These circumstances needlessly increase the heap size of a program. As conventional memory management tools do not provide such information, developers usually are unaware of whether a program efficiently uses portions of allocated memory blocks.

SUMMARY OF THE INVENTION

The present invention provides a solution for intra-memory block usage analysis. One embodiment of the present invention can include a method of intra-memory block memory usage analysis for a program. The method can include identifying a memory block that has been allocated to the program. The method also can include writing a predetermined bit pattern to the memory block after allocation to the program. The predetermined bit pattern can include a plurality of different bit values. Responsive to a predetermined event, the entire contents of the memory block can be scanned to identify remaining portions of the predetermined bit pattern. The remaining portions of the predetermined bit pattern within the memory block can be identified as unused portions of the memory block.

The present invention also relates to a method of intra-memory block usage analysis for a program that includes identifying a memory block that has been allocated to the program and monitoring read access to the allocated memory block. Responsive to a predetermined event, a measure of complexity for the contents of the allocated memory block can be calculated by analyzing data contained in the memory block to identify patterns of recurring or repeating data. The method also can include determining that at least a portion of the allocated memory block was not used if the measure of complexity is below a threshold value and the allocated memory block was not read.

Another embodiment of the present invention can include a machine readable storage being programmed to cause a machine to perform the various steps described herein.

BRIEF DESCRIPTION OF THE DRAWINGS

There are shown in the drawings, embodiments that are presently preferred; it being understood, however, that the invention is not limited to the precise arrangements and instrumentalities shown.

FIG. 1 is a schematic diagram illustrating a system for locating unused memory in accordance with one embodiment of the present invention.

FIGS. 2A and 2B, taken together, illustrate intra-memory block usage analysis in accordance with another embodiment of the present invention.

DETAILED DESCRIPTION OF THE INVENTION

Figure 3:
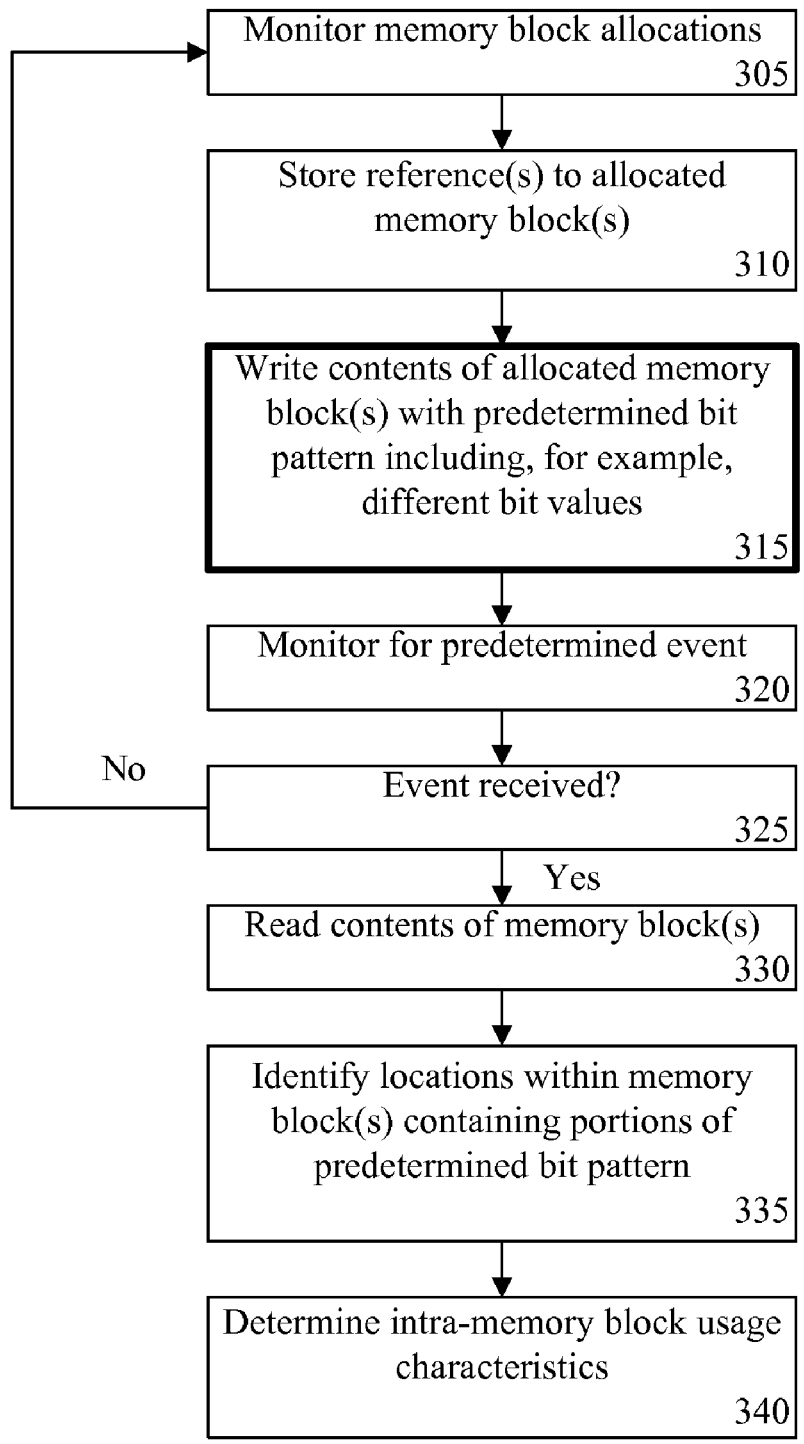
FIG. 3 is a flow chart illustrating a method of memory usage analysis in accordance with another embodiment of the present invention.

The present invention provides a solution for locating wasted or unused memory on an intra-memory block basis. In accordance with the inventive arrangements disclosed herein, an analysis of intra-memory block usage by a program can be performed. Memory blocks allocated to a program can be evaluated to determine how much of the memory blocks were used by the program during execution. This allows developers to locate unused portions of memory within memory blocks and, through further developmental efforts, reduce the amount of memory used and/or needed by the program.

FIG. 1 is a schematic diagram illustrating a system for locating unused memory in accordance with one embodiment of the present invention. As shown, the system can include an operating system 105, or some other memory management system, a memory test tool (memory tool) 110, and a program 115 that is to undergo intra-memory block usage evaluation.

Dynamic memory 120 also can be included. The dynamic memory 120 can include one or more blocks of assignable, or allocatable, memory. As such, the dynamic memory 120 is divided into a pool of memory blocks 125, 130, 135, and 140. While the dynamic memory 120 can include many more memory blocks, only four have been shown for purposes of illustration.

The operating system 105, memory tool 110, and program 115 can be implemented as one or more computer programs. The programs 105-115 and dynamic memory 120 can be disposed and function within a suitable computer system. The computer system can be any of a variety of different information processing systems, whether a desktop computer, portable computer, server, or the like. Further, the computer system can be a distributed computer system having a plurality of individual processing nodes communicatively linked via a network.

The operating system 105 can be any of a variety of different operating systems which provides memory management functions such as allocating memory blocks to programs and deallocating memory blocks. The operating system 105 further can provide other standard operational and memory management functions including, but not limited to, memory recovery such as garbage collection and the like.

In one embodiment, memory tool 110 can be a standalone program capable of analyzing the way in which program 115 utilizes memory blocks allocated from dynamic memory 120. Memory tool 110 can execute in real time in conjunction with program 115 to monitor and evaluate intra-memory block usage for memory blocks allocated to program 115 during runtime. In another embodiment, memory tool 110 can be implemented as, or be included as a function within, an integrated development environment (IDE). In that case, the IDE can provide a non-runtime simulation environment in which program 115 can be executed and/or tested while memory tool 110 analyzes intra-memory block usage by program 115. If operating in the context of an IDE, the memory tool 110 may have less interaction with operating system 105 as the IDE can provide the simulation environment and operating system related functions.

In another embodiment, the memory tool 110 can be included within a development tool such as Rational® Purify available from International Business Machines Corporation (IBM), of Armonk, N.Y. IBM Rational® Purify is a runtime analysis solution that provides memory corruption detection and memory leak detection. Memory analysis tools such as IBM Rational® Purify can be incorporated into existing IDE's and can provide functions such as tracking memory allocations, deallocations, and program exits. In any case, the memory tool 110 can determine the state of locations within allocated memory blocks as being initialized, meaning used, or uninitialized, meaning unused.

Memory tool 110 can track memory block allocations to program 115 and memory block deallocations from program 115. A deallocation can refer to the freeing or deletion of a memory block under the control of program 115 or operating system 105. For example, a deallocation can include a garbage collection operation performed by the operating system 110 or another memory management program. Memory tool 110 further can detect when program 115 exits. Such an operation may or may not cause any memory blocks allocated to program 115 to be released.

As shown, memory tool 110 can be provided with an address, handle, or offset to memory block 130 when memory block 130 is allocated to program 115. Any addresses of memory blocks allocated to program 115 can be stored by memory tool 110 for future use or reference. Memory tool 110 can determine one or more memory block usage characteristics on an intra-memory block level. That is, the memory tool 110 can determine how much of a given allocated memory block has been used by program 115 as well as which portions were used.

It should be appreciated that the illustrations and examples used herein, including those referring to the memory tool 110, are not intended to be limiting with respect to the scope of the present invention. Rather, any suitable memory management program or tool capable of performing the functions described herein can be used.

FIGS. 2A and 2B, taken together, illustrate intra-memory block usage analysis in accordance with another embodiment of the present invention. FIG. 2A illustrates a memory block 200 that has been allocated to a program under test. Once allocated, the memory tool can write, or spray, memory block 200 with a predetermined bit pattern, referred to as a magic bit pattern. The bit pattern is represented in FIG. 2A with cross-hatching. Thus, prior to use by the program to which memory block 200 was allocated, the contents of memory block 200 specify the known bit pattern.

FIG. 2B represents memory block 200 after a period of time, during which the program that acquired memory block 200, has executed. During this period of time, the program has accessed memory block 200. The period of time can be measured by, or end, due to the occurrence of a predetermined event. Responsive to this event, memory block 200 can be scanned by the memory tool. That is, the contents of memory block 200 can be read. Any portions of memory block 200 that still include the known bit pattern, in this case portion 205, can be labeled or identified as unused by the program. Portions of memory block 200 that do not contain the known bit pattern, i.e. portion 210, have been overwritten and, thus, can be labeled or identified as being used by the program.

The memory tool can analyze or read the contents of memory block 200 at the byte and/or bit level. Accordingly, one or more intra-memory block usage characteristics can be determined. Examples of such characteristics can include, but are not limited to, which bits and/or bytes have been used by the program as well as the amount, or percentage, of the memory block that was used by the program.

Allocation and deallocation events can vary according to the programming language and/or environment used. With respect to heap memory usage in the C programming language, for example, the functions "malloc" and "free" are responsible for allocating and de-allocating program memory respectively. The operation of such functions can be modified or intercepted to trigger analysis operations. For instance, spraying the known pattern at allocation time can be triggered responsive to detecting or intercepting the function "malloc". Scanning or otherwise detecting the used and unused portions of a block at deallocation time can be triggered responsive to detecting or intercepting the "free" function.

In a JAVA® environment, the JAVA Virtual Machine can be configured to send reports of memory allocation events to the memory analysis tool. The JAVA Virtual Machine further can send garbage collection events. From such reports, the memory analysis tool can determine which memory blocks have been de-allocated.

Aspects of the present invention also can be extended to stack memory. In that case, function entry time can correspond to the allocation time or an allocation event. Function exit time can correspond to deallocation time. Another example of an allocation event can be detection of the function "alloca". Use of this function, however, is limited to the use of native code in conjunction with JAVA.

In another embodiment of the present invention, a measure of complexity can be used to determine used and unused portions of memory blocks. Complexity can be determined through the use of algorithms such as Run Length Encoding (RLE), Lempel-Ziv-Welch (LZW), other proprietary algorithms, and the like. Algorithms such as these can analyze data to identify patterns of recurring or repeating data as shown in block 215. In any case, such an embodiment can be useful in cases where the application under test performs some sort of memory initialization. Memory initialization typically involves setting the memory to a noncomplex and/or repeating byte pattern. For example, nulls can be written to memory blocks during initialization.

In any case, memory allocations, reads, writes, and memory deallocations can be tracked. Such operations can be tracked using a table or other data structure. When memory is de-allocated, the memory block can be analyzed using a conventional complexity determination algorithm. Portions of the memory block that are not complex, or that have a measure of complexity that is below a predetermined threshold as determined by the complexity determination algorithm, and which have not been read, can be considered intra-memory block waste as indicated in block 220.

Use of complexity as a measure ensures that a memory block that has been at least partially read, but that includes usable information, such as a database table, will not be regarded as wasted or unused intra-block memory. The usable information likely will be evaluated as having a degree of complexity that is above the minimum threshold. It should be appreciated, however, that use of a complexity determination algorithm may require tuning. Such tuning can depend upon the application that is under test and/or the data patterns in memory that are evaluated.

FIG. 3 is a flow chart illustrating a method of memory usage analysis in accordance with another embodiment of the present invention. The method can be performed by the memory tool and begin in a state where the memory tool has been initialized and is executing in a cooperative manner with a program under test. Accordingly, in step 305, the memory tool can monitor for memory block allocations to a running program, i.e. program under test. The present invention can be configured to detect or intercept requests for memory blocks from the program under test or memory allocations to the program from the operating system and/or memory management-system.

In step 310, any reference(s) to allocated memory block(s) can be stored for future use. In step 315, the contents of any allocated memory block(s) can be written with a predetermined bit pattern. An example of such a bit pattern can be 0xDEADBEEF. The present invention, however, is not limited to this bit pattern as others also can be used. In step 320, the memory tool can begin monitoring for the occurrence of a predetermined event. The predetermined event can include, but is not limited to, one that causes a deallocation of the memory block, whether caused by the program itself, the operating system, or a memory management system, the program exiting, or a request to analyze the intra-memory block usage of the program. In another embodiment, in a garbage collection environment for example, the event can be an object finalizer or garbage collection deallocation event. Such events can be intercepted using known scanning techniques.

Regardless, in step 325, a determination can be made as to whether such an event has been detected or intercepted. If not, the method can loop back to step 305 to continue monitoring for memory block allocations. If so, the method can continue to step 330. In step 330, the contents of any allocated memory block(s) can be read. Allocated memory blocks can be accessed through the stored memory block references. It should be appreciated that the predetermined event can be detected in the midst of program execution and before, during, or after a memory block has been deallocated.

In step 335, any locations within the memory block(s) allocated to the program under test that include portions of the predetermined bit pattern can be identified. Remaining portions of the bit pattern indicate that such portions, or locations, of the memory block were not used or written by the program under test.

In step 340, one or more intra-memory block usage characteristics can be determined. The usage characteristics can include, but are not limited to, identifying particular bytes, or bits as the case may be, of the memory block(s) that were used or unused as well as identifying the percentage or amount of the memory block(s) that were used or unused by the program. In another embodiment, a usage characteristic can refer to a pictorial illustration of which locations within the memory block have been used or gone unused.

The method of FIG. 3 can be applied to the case of a single memory block being allocated to a program or to the case of a plurality of memory blocks being allocated to the program. As such, the inventive arrangements disclosed herein can be used to analyze any number of memory blocks allocated to the program under test. Further, the techniques described herein can be used to scan the heap of a program under test for all in-use blocks as determined through the interception or detection of allocation and/or deallocation events. Accordingly, determinations can be made as to which portions of such in-use memory blocks are actually being used.

Figure 4:
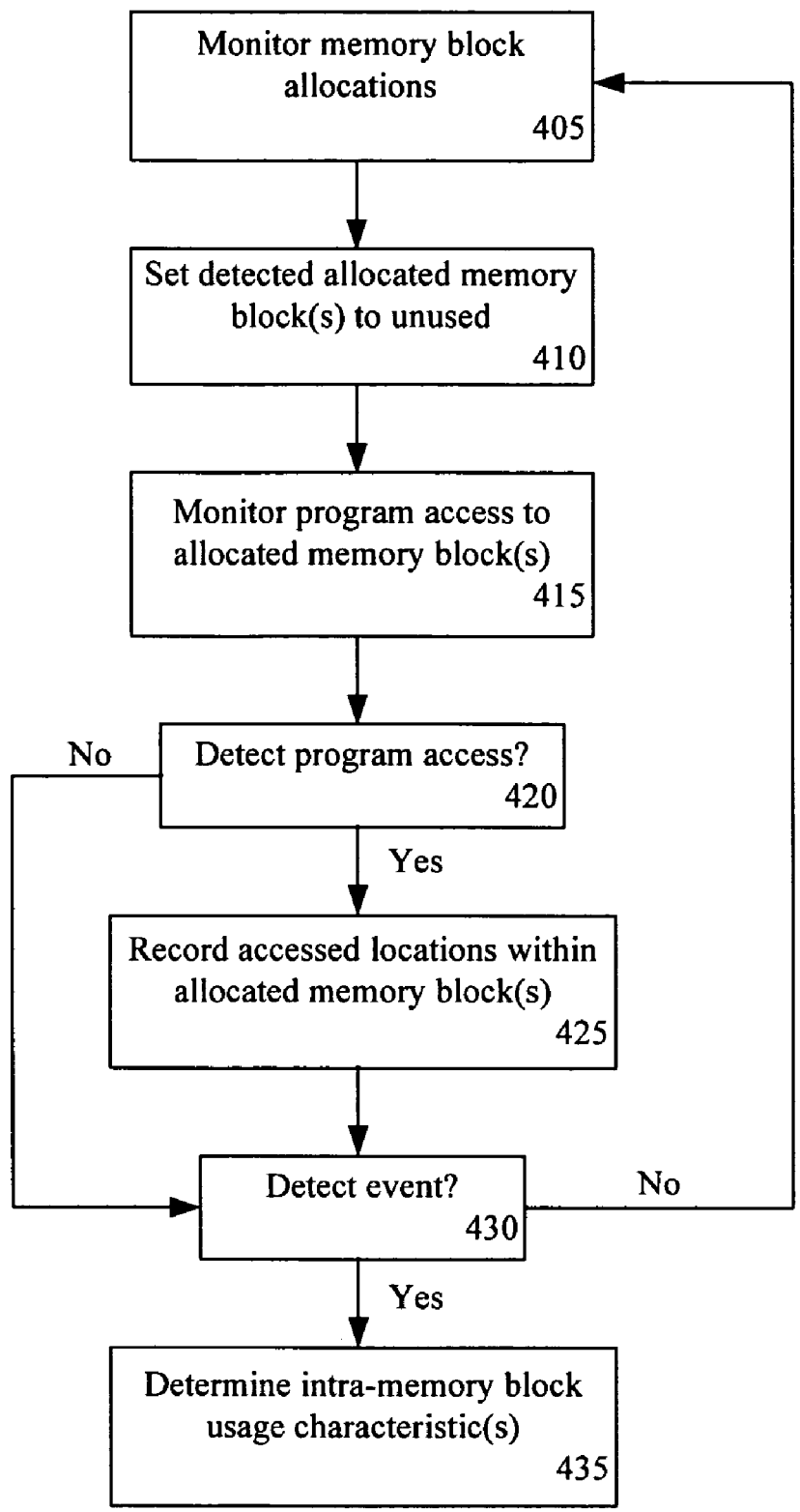
FIG. 4 is a flow chart illustrating a method of memory usage analysis in accordance with yet another embodiment of the present invention.

FIG. 4 is a flow chart illustrating a method of memory management in accordance with yet another embodiment of the present invention. The method can be used in cases where allocated memory blocks are guaranteed to be initialized to a particular value such as zero. When the memory block is known to be initialized to a particular value, the program under test may rely on and use such values without first writing to the memory block. In such cases, rather than utilizing a spray pattern, a technique for tracking read and/or write operations of the program to allocated memory blocks can be used.

Accordingly, the method can begin in a state where the memory tool is executing along with the program under test. In step 405, the memory tool can begin monitoring memory block allocations to a running program. In step 410, the state of any allocated memory blocks intercepted or detected in step 405 can be set to "unused". In step 415, the memory tool can monitor program access to allocated memory block(s). Program access can include a read and/or write operation by the program under test to a memory block allocated to the program.

In step 420, a determination can be made as to whether a program access to one of the allocated memory blocks has been detected. If so, the method can proceed to step 425. If not, the method can continue to step 430. In step 425, the particular location, or locations, accessed within the allocated memory block(s) by the program can be recorded or stored for later use. Such locations can be identified as being used by the program.

In step 430, a determination can be made as to whether a predetermined type of event has been detected and/or intercepted. As noted, the predetermined event can be detected in the midst of program execution and before, during, or after a memory block has been deallocated. The event, as described herein, can be a deallocation of a memory block, a program exit, or the like. With respect to garbage collection, the event can be an object finalizer or garbage collection deallocation event. If such an event is intercepted, the method can proceed to step 435. If not, the method can loop back to step 405 to continue monitoring for further memory block allocations.

Continuing with step 435, one or more intra-memory block usage characteristics can be determined. As noted, the usage characteristics can include, but are not limited to, identifying particular bytes, or bits as the case may be, of memory block(s) that were used or unused as well as identifying the percentage or amount of the memory block(s) that were used or unused by the program. The memory tool further can present a pictorial illustration of which locations within the memory block have been used.

Figure 5:
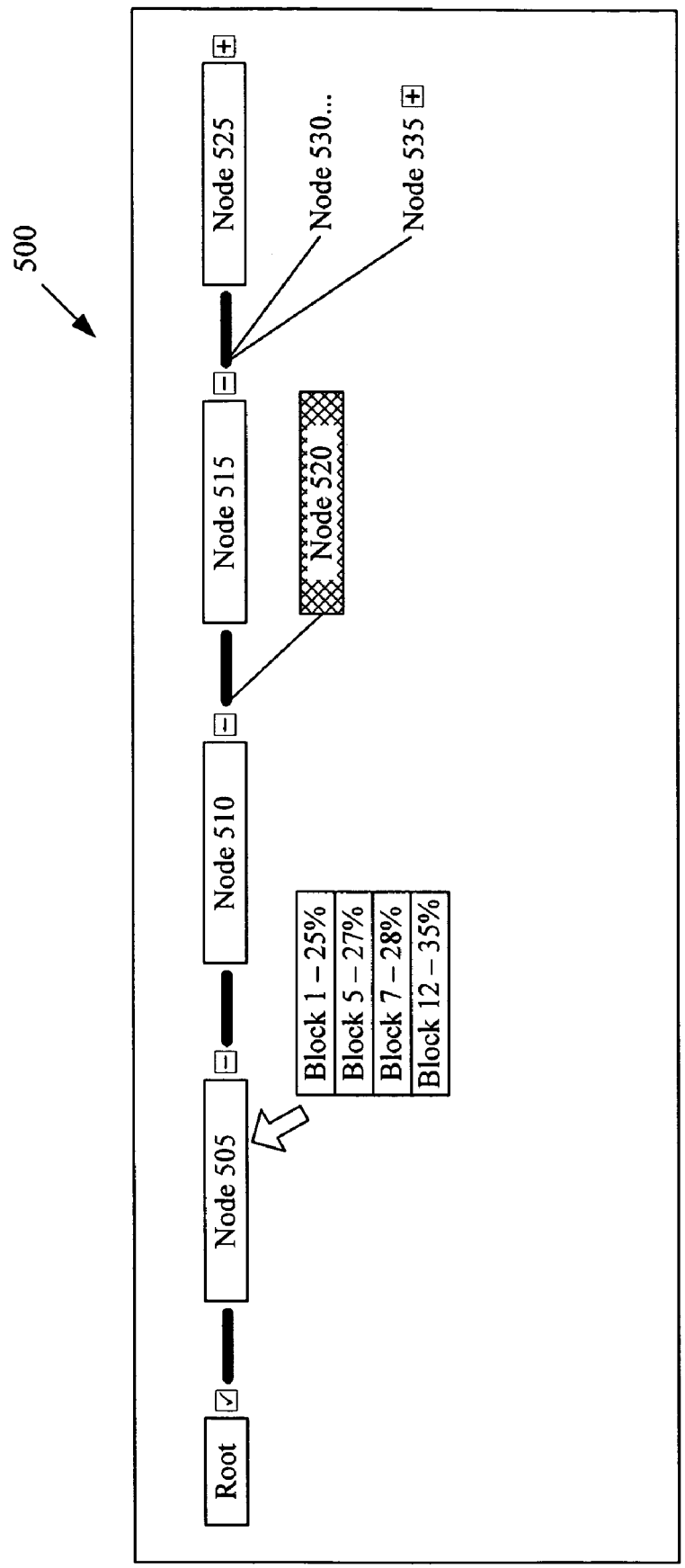
FIG. 5 is a view that can be presented within a graphical-user interface for presenting memory block usage characteristics in accordance with the inventive arrangements disclosed herein.

FIG. 5 is a view 500 that can be presented within a graphical-user interface for presenting memory block usage characteristics. View 500 illustrates a call graph that can depict memory block allocations to various portions or sections of code. Traversing the call graph from the root node, representing the top of the hierarchy, to the right, representing the bottom of the hierarchy, each of nodes 505, 510, 515, 520, 525, 530, and 535 can correspond to a method or other segment or unit of code of the program under test.

In one embodiment, the hierarchy can be ordered such that a node that is to the left of another node will have been allocated more memory blocks than the node to the right. In another embodiment, the node hierarchy can reflect intra-memory block waste. In that case, a node to the left of another node will have a larger amount of wasted or unused portions of memory blocks allocated to it than the one to the right. In yet another embodiment, nodes that are responsible for the largest amount of intra-memory block waste can appear in a default or top-level view of the call graph. In that case, only nodes associated with levels of intra-memory block waste above a given threshold, or a top number of nodes, can be included in the default view, with other nodes being excluded.

The lines connecting each node in view 500 also can be used to indicate the amount of intra-memory block waste associated with each node. In this case, thicker lines can correspond to increased waste, while thin lines can correspond to less waste. Those skilled in the art will recognize that colors, textures, or other indicators, whether applied to lines linking nodes or to the nodes themselves, can be used to indicate intra-memory block waste.

Further detail relating to intra-memory block usage of a particular node can be provided responsive to a user request for such information. For example, a user can request further detail by right clicking on a particular node in view 500, selecting an activatable icon or menu item within the memory analysis tool, issuing one or more key commands, pointer commands, or the like. In another example, further detail can be presented responsive to detecting that a pointer has hovered over a node for a minimum amount of time. In that case, additional detail can be presented as a tool tip, for instance.

View 500 includes a pop-up style window 540 that has been presented responsive to a request for further detail regarding the intra-memory block usage for node 505. As shown, window 540 includes a listing of memory blocks that have been allocated to node 505. Associated with each memory block in the list can be a percentage value indicating the amount of the memory block that was used. The listing of memory blocks, though not shown, can be ordered according to increasing or decreasing intra-memory block waste. Users can select a memory block from the list and view a more detailed analysis of the usage of that memory block. Such analysis can be presented as a text-based report or as a graphical representation of the memory block.

The examples and illustrations provided herein are not intended to be limitations of the present invention. Rather, it should be appreciated that intra-memory block usage characteristics can be presented using a variety of different user-interfaces or user interface elements. In one embodiment, a text-based report can be provided. In another embodiment, graphical charts which provide a visual illustration of the amount of waste within individual memory blocks can be presented. Combinations of text-based information and graphical information can be presented.

The present invention provides a mechanism for analyzing memory blocks allocated to a program and detecting unused portions of those memory blocks. By identifying such unused space within memory blocks, developers are provided with an opportunity to reduce memory consumption of a program. The present invention can be utilized with programs developed using any language capable of dynamic memory allocation.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, program, software, software application, or application, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of intra-memory block usage analysis for a program comprising:

during execution of the program, detecting dynamic allocation of a memory block from the operating system to the program;

prior to use of the memory block by the program and during execution of the program, a memory tool writing a predetermined bit pattern to the memory block after allocation to the program, the predetermined bit pattern comprising a plurality of different bit values;

responsive to a predetermined event of the program, the memory tool scanning the entire contents of the memory block to identify remaining portions of the predetermined bit pattern;

identifying the remaining portions of the predetermined bit pattern within the memory block as unwritten portions of the memory block; and indicating which portions of the memory block were unwritten according to identifying the remaining portions of the predetermined bit pattern.

2. The method of claim 1, further comprising indicating a percentage of the memory block that was not written by the program according to identifying the remaining portions of the predetermined bit pattern.

3. The method of claim 1, further comprising indicating which bits of the memory block were not written by the program according to identifying the remaining portions of the predetermined bit pattern.

4. The method of claim 1, wherein the predetermined event is a request for at least one intra-memory block usage characteristic.

5. A method of intra-memory block usage analysis for a program comprising:
during execution of the program, detecting dynamic allocation of a memory block from the operating system to the program, wherein contents of the memory block are initialized and non-complex;
monitoring read access to the allocated memory block;
responsive to a predetermined event deallocating the memory block, calculating a measure of complexity for the contents of the memory block by analyzing data contained in the memory block to identify patterns of recurring or repeating data;
determining that at least a portion of the memory block was used if the measure of complexity is above a threshold value; and
determining that at least a portion of the allocated memory block was not used if the measure of complexity is below the threshold value and the allocated memory block was not read.

6. The method of claim 5, further comprising determining a measure of how much of the memory block was used by the program or an indication of which portions of the memory block were used by the program.

7. The method of claim 5, further comprising:
repeating said detecting, monitoring, calculating and determining steps for further memory blocks allocated to the program.

8. The method of claim 1, further comprising presenting a view of a call graph specifying the unused portions of the memory block, wherein the call graph comprises a plurality of nodes, wherein each node represents a method of the program, and displaying a list of memory blocks dynamically allocated to at least one of the plurality of nodes during execution of the program, and displaying within the list of memory blocks, an amount of each respective memory block to which the program wrote data during execution of the program.

9. The method of claim 1, further comprising presenting a call graph specifying a plurality of nodes corresponding to program methods, wherein the plurality of nodes is organized in a hierarchy that is dependent upon unused portions of memory blocks dynamically allocated to each respective node, wherein each line extending from a node has a thickness determined according to the unused portions of the memory blocks dynamically allocated to that node.

10. A machine readable storage, having stored thereon a computer program having a plurality of code sections executable by a machine for causing the machine to perform the steps of:
during execution of a program, detecting dynamic allocation of a memory block from the operating system to the program;
prior to use of the memory block by the program and during execution of the program, a memory tool writing a predetermined bit pattern to the memory block after allocation to the program, the predetermnined bit pattern comprising a plurality of bit values;
responsive to a predetermnined event of the program, the memory tool scanning the entire contents of the memory block to identify remaining portions of the predetermined bit pattern;
identifying the remaining portions of the predetermined bit pattern within the memory block as unwritten portions of the memory block; and
indicating which portions of the memory block were unwritten according to identifying the remaining portions of the predetermined bit pattern.

11. The machine readable storage of claim 10, wherein the predetermined event is a request to exit the program.

12. The machine readable storage of claim 10, wherein the predetermined event is a deallocate operation for the memory block.

13. The machine readable storage of claim 10, wherein the predetermined event is a request for at least one intra-memory block usage characteristic.

14. The machine readable storage of claim 10, further comprising presenting a view of a call graph specifying at least one intra-memory block usage characteristic for the allocated memory block, wherein the call graph comprises a plurality of nodes, wherein each node represents a method of the program, and displaying a list of memory blocks dynamically allocated to at least one of the plurality of nodes during execution of the program, and displaying within the list of memory blocks a percentage of each respective memory block to which the program did not write data during execution of the program.

15. The method of claim 5, wherein the predetermined event is a deallocate operation for the memory block.

16. The method of claim 5, wherein the predetermined event is a request to exit the program.

17. The method of claim 5, wherein the predetermined event is a request for at least one intra-memory block usage characteristic.

18. The method of claim 5, further comprising presenting a view of a call graph specifying the unused portions of the memory block, wherein the call graph comprises a plurality of nodes, wherein each node represents a method of the program, and displaying a list of memory blocks dynamically allocated to at least one of the plurality of nodes during execution of the program, and displaying within the list of memory blocks a percentage of each respective memory block to which the program wrote data during execution of the program.

19. The method of claim 5, further comprising presenting a call graph specifying a plurality of nodes corresponding to program methods, wherein the plurality of nodes is organized in a hierarchy that is dependent upon unused portions of memory blocks allocated to each respective node, wherein each line extending from a node has a thickness determined according to the unused portions of the memory blocks allocated to that node.

20. The machine readable storage of claim 10, further comprising presenting a call graph specifying a plurality of nodes corresponding to program methods, wherein the plurality of nodes is organized in a hierarchy that is dependent upon unused portions of memory blocks dynamically allocated to each respective node, wherein each line extending from a node has a thickness determined according to the unused portions of the memory blocks dynamically allocated to that node.

* * * * *